Nov. 7, 1967    J. A. BIDDLE    3,351,111
HARDWARE LOCATING AND STARTING TOOL
Filed Aug. 23, 1965
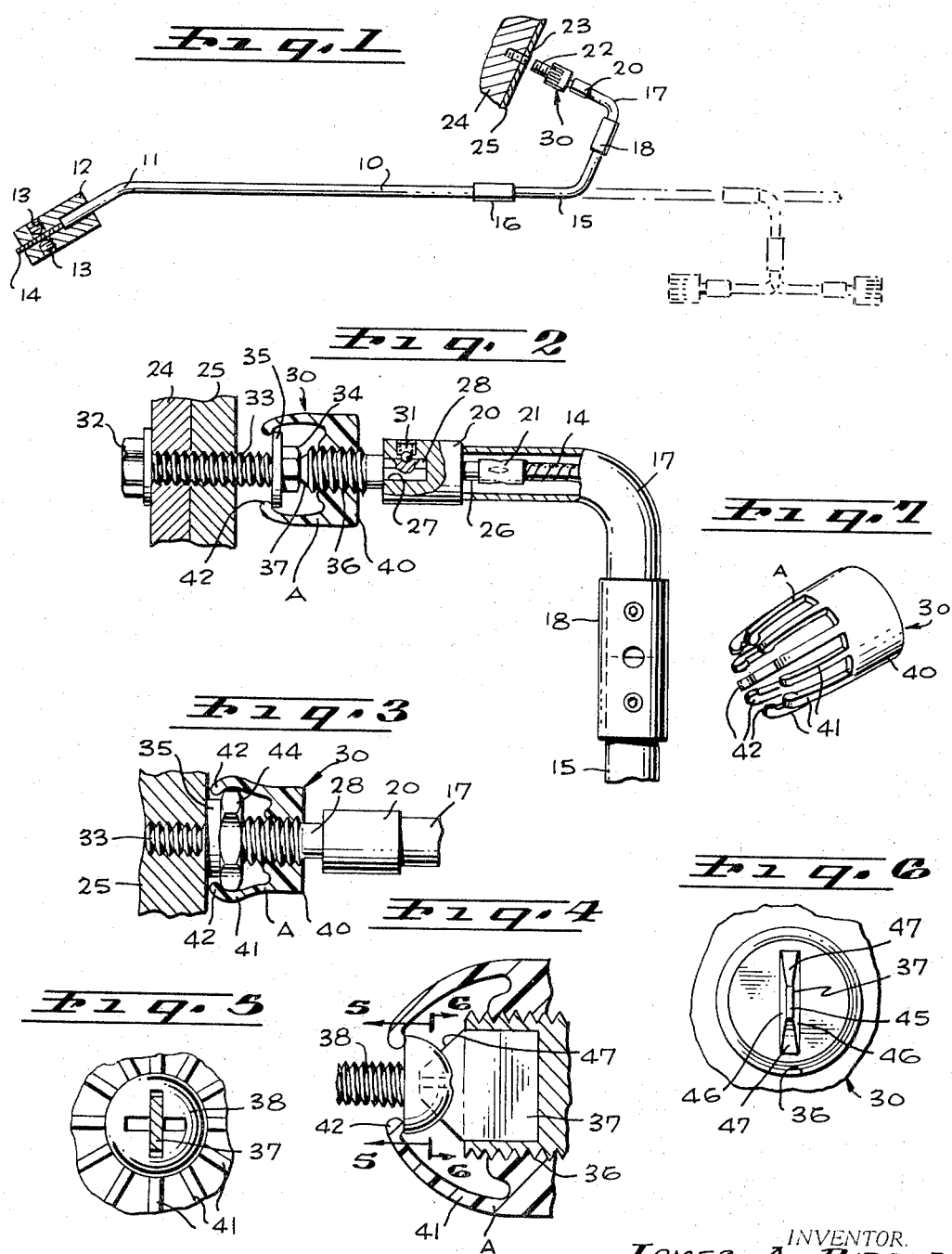
INVENTOR.
JAMES A. BIDDLE
BY Allan M. Shapiro
ATTORNEY

# United States Patent Office 3,351,111
Patented Nov. 7, 1967

3,351,111
HARDWARE LOCATING AND STARTING TOOL
James A. Biddle, Los Angeles, Calif.
(16355 Vintage St., Sepulveda, Calif. 91343)
Filed Aug. 23, 1965, Ser. No. 481,460
8 Claims. (Cl. 145—52)

ABSTRACT OF THE DISCLOSURE

A tool comprising a preformed and shaped rigid tubular member enclosing a flexible cable along the full length thereof and having means at one end for securing a hardware item holding means. The opposite end of the flexible cable is provided with a releasable knob whereby rotary movement of the knob effects rotary movement of the holding means via the flexible cable so that the hardware item may be remotely rotated. Angled extension segments may be added to the tubular member which enclose additional lengths of cable, if desired.

---

This invention relates to locating and starting tools for items of assembly hardware or rotatable fasteners such as bolts, screws, nuts and so forth and more particularly to a novel preformed and rigid tool which may be held in various different angular positions for aligning mating hardware items and which may be operated to initiate engagement or disengagement of variety of hardware items disposed in relatively inaccessible locations.

In assembly work, there are many occasions when it is desirable to locate and align hardware items such as bolts, nuts, screws and the like with respect to each other or with respect to mating parts in an assembly. The alignment and eventual mating of the hardware parts is particularly difficult when the parts are not physically or visibly accessible because of size, shape and location. Problems of locating and alignment of the mating parts are particularly acute when work is required where it is not practical to disassemble the entire assembly in order to reach inaccessible parts. Not only does compact and precise location of the parts to be mated make difficult alignment and actuating problems, but the present state of the art of precision threads is such that precise initial alignment of both parts of a rotatable fastener is required.

Furthermore, simplicity of construction is also an important consideration so that locating and starting tools are inexpensive to manufacture and easy to assemble and clean when necessary. It is also desirable that the tool be workable in adverse environmental conditions such as in extreme heat and cold conditions, radioactive environments or when extremely dirty conditions are encountered.

It is desirable that means be provided on the free end of a locating tool which will readily accommodate the insertion and withdrawal of a hardware item such as a nut or screw once the item has been located or withdrawn from its mating piece as well as when the item or part is being manipulated by the tool. Such a means is also provided for in accordance with the present invention whereby various shaped items may be readily accommodated on the end of a locating tool.

Accordingly, the present invention provides for a novel locating and starting tool which includes a preformed length of rigid tubular stock having an angularly disposed elbow at one end thereof through which a flexible member is rotatably disposed. The length of tubular stock may be extended by incorporating various additional combinations of angled tubular stock pieces in the form of arms or extensions so that the tool may be manipulated into and out of generally remote inaccessible areas. One end of the flexible cable member has secured thereto a chuck which is adapted to receive any one of a number of tool accessories, including a novel gripping member forming a part of the present invention, for holding a hardware item or part during the locating and starting operation. The opposite end of the cable is detachably secured to a rotary member whereby varying lengths of cable can be accommodated to match the varying lengths of tubular stock as well as to rotatably connect the rotary member to the chuck.

Therefore, it is a primary object of the present invention to provide a novel locating and starting tool which will enable generally inaccessible hardware parts in an assembly to be manipulated without difficulty, and which is not likely to break or be subject to inadvertent operation.

It is another object of the present invention to provide an operating handle for a novel hardware part locating and rotating tool which embodies novel features of construction whereby the handle may be held in various different angular positions with respect to generally remote and inaccessible assembly areas whereby the hardware part in the assembly area may be manipulated such as by screwing, for example, into or out of position without difficulty.

Still a further object of the present invention is to provide a novel locating and starting tool which includes a shaped and rigid tubular handle encasing a rotary flexible means for engaging a rotable fastening, such as a screw or nut, the handle being offset laterally from the end thereof so that the tool has positional advantages from the standpoint of visibility and accessibility.

Still another object of the present invention is to provide a novel rotable fastener holding or retaining means which is detachably connected to a locating and starting tool so that the rotable fastening may be readily achieved by the tool between two parts.

Still a further object of the present invention is to provide a novel rotatable fastener holding or gripping means which includes a plurality of radially pivoting fingers adapted to detachably connect and retain various hardware accessories such as bolts, nuts, screws or the like.

The features of the present invention which are believed to be novel are set forth with particularity in the appended claims. It is to be noted that the principles of the invention are applicable to other similar hardware manipulating tools, such as top holders, reamers, nut setters, screwdrivers and the like. The invention, both as to its organization and manner of operation, together with further objects and advantages thereof, may be understood by reference to the following description, taken in connection with the accompanying drawings, in which:

FIGURE 1 is a side elevational view, partly in section, of a novel locating and starting tool in accordance with the present invention illustrating the tool in various operating positions as denoted by solid broken lines;

FIGURE 2 is an enlarged elevational view, partly in section, of a portion of the tool shown in FIGURE 1 illustrating a novel part or object gripping member employed in an assembly operation to initiate the joining of rotatable fastening parts;

FIGURE 3 is a sectional view of the gripping member shown in FIGURE 2 illustrating the member employed in a disassambly operation to remove or separate rotatable fastening parts from each other;

FIGURE 4 is an enlarged fragmentary sectional view of the gripping member shown in FIGURES 2 and 3 illustrating the member employed in an assembly operation in connection with a conventional screw;

FIGURE 5 is a fragmentary sectional view taken along lines 5—5 of FIGURE 4;

FIGURE 6 is a fragmentary sectional view taken along lines 6—6 of FIGURE 4; and

FIGURE 6 is a fragmentary sectional view taken along lines 6—6 of FIGURE 4; and

FIGURE 7 is a perspective view of the gripping member illustrated in FIGURES 2, 3 and 4.

Corresponding and like parts are referred to in the following description and indicated in all the views of the drawings by the same reference characters.

Referring now in detail to FIGURE 1, one embodiment of the present invention is illustrated which includes a length of preformed and shaped rigid tubular stock 10 which is provided at one end thereof with a shaped integral elbow 11 arranged at a small angle with respect to the longitudinal axis of the stock. Rotatably mounted about a portion of the free end of the elbow 11 is a knurled member 12 having a pair of opposing set screws 13 threadably retained thereon which are adapted to converge into holding contact with one end of a flexible member 14. The member 14 may take the form of a cable which extends through the elbow 11 and stock 10 and is rotatable therein upon rotation of the member 12. The opposite end of the cable 14 from its end coupled to member 12 extends through an angular tubular member 15 which is attached on the end of stock 10 from its end rotatably carrying member 12 by means of a coupling sleeve 16. A short tubular arm 17 is similarly attached to the end of the member 15 via a coupling sleeve 18. The end of the cable opposite to its end passing through the rotatable member 12 terminates exteriorally of the arm 17 in a chuck 20 which is of larger diameter than the diameter of the tubular arm 17 so that the rear side of the chuck abuts against the exposed end of the arm. The chuck is operatively secured to the free end of the cable by means of a swaged or crimped connector 21 as shown more clearly in FIGURE 2 which connects the chuck to the flexible cable so that rotation of the cable is followed by rotation of the chuck.

Although the embodiment of FIGURE 1 shows a tubular member 10 and a plurality of angular tubular sections and arms connected on one end thereof, it is to be understood that other shaped and preformed straight and angular tubular sections may be mounted in co-extensive relationship with the tubular stock 10 without departing from the present invention. As shown in solid lines, the tool of the present invention includes angular pieces 15 and 17 so as to conveniently locate the chuck 20 carrying a rotatable fastener 22 into proper alignment for engaging the shank of the fastener with a receptacle 23 provided in a pair of mated workpieces represented by numerals 24 and 25. In other applications, the angled tubular members or sections may take the form of the portion shown in broken lines in FIGURE 1.

Referring now to FIGURE 2, the chuck 20 is shown in more detail which further includes a shank 26 which projects into the hollow bore of the arm 17 into contact with the end of cable 14 via the connector 21. The rear end of the chuck butts against the free end of the arm 17 while the chuck is held in this position by means of the set screws 13 in the rotary member 12 being forcibly urged into contact with the opposite end of cable 14. Therefore, surplus lengths of cable 14 may extend from the rotary member 12 depending upon the combined lengths of arms and extensions which are added to the primary tubular stock 10. The chuck further includes a square or hexagon shaped receptacle 27 for receiving a shank, as a shank 28, from a suitable hardware parts gripping or engaging member, such as indicated in the general direction of arrow 30. The chuck 20 also includes a ball type detent 31 for releasably securing the shank 28 thereto; however, it is to be understood that other types of releasable connections to detachably secure a gripping or engaging member with the chuck can be employed without departing from the present invention.

FIGURE 2 also illustrates a bolt type fastener 32 having a shank 33 carrying a plurality of threads which projects through a common coaxial bore formed in workpieces 24 and 25. The shank 33 projects beyond the surface of the workpiece 25 and is adapted to receive a rotatable fastener such as a nut 34 thereon and including a conventional washer 35 which is disposed between the nut 34 and the surface of the workpiece 25 after the nut has been tightened down.

A novel hardware item or parts engaging or gripping member is illustrated in FIGURE 2 in connection with holding and retaining the nut and washer combination in position during initial engagement of the hardware part with the shank 33 or which may be employed for effecting disengagement therefrom. The gripping member 30 includes a threaded body portion 36 integrally arranged and coaxially related to the shank 28. On the end of the central portion 36 opposite to its end integrally formed with the shank 28, there is provided a shaped or tapered wedge 37 which is adapted to be received into the threaded bore of a conventional nut, such as represented by numeral 34 or which may be received into a slot formed in a conventional screw. With respect to the embodiment shown in FIGURES 4–5, the wedge 37 is shown being adapted for insertion into a formed slot in the head of a screw 38 which is of the Phillips type.

Rotatably mounted on the central threaded portion 36 of the gripping member there is provided a body portion 40 incorporating a plurality of fingerlike resilient projections or ribs extending away from one side of the body 40. Each projection or rib is provided with a thickened portion or nub 42 located on the extreme cantilevered free end thereof. Each projection is cantilevered from the body 40 so as to provide a pivot area indicated by the character A about which the projections bend during installation of the projections about the periphery of a hardware part. In FIGURE 2, the projections are shown disposed about the washer 35 whereby the nub or thickened portion 42 close over the periphery of the washer to retain the washer against one side of the nut 34 while the wedge 37 is inserted within the bore of the nut. Therefore, the washer and nut are retained within the gripping member 30 and since this member is detachably secured to the chuck 20, rotation of the rotatable member 12 will cause the chuck and hence the gripping member to rotate via cable 14 to thread the nut 34 to the shank 33 of the rotatable fastener.

Once the threading operation has been initiated, the tool may be wiggled or twisted such that the projections 41 will flex about their respective pivot areas A until the nub or thickened portions 42 on the end of the cantilevered projections disengage with the hardware part, such as the washer 35. The nut may be tightened onto the bolt 32 by the employment of other suitable tools or by rotating the bolt 32 with respect to the nut 34 by holding nut 34 in position by means of the present invention.

Referring now in detail to FIGURE 3, another hardware item is shown in the form of the nut 44 which is threaded onto the shank 33 of the bolt. Washer 35 is disposed between the surface of part 25 and one side of the nut 44. In this illustration, the body 40 in combination with the wedge 37 is employed to detach nut 44 from the threaded shank 33 during a disassembling operation. In this event, the cantilevered projections 41 are forced about the periphery of the nut 44 in such a manner that the nub or thickened portions 42 on the ends of the projections grip or engage to hold the body 40 onto the nut. The wedge 37 is inserted into the threaded bore of the nut so that its side edges engage with the bore to retain the nut in position. Next, the chuck is rotated so that the gripping member is rotated to remove the nut 44 from the shank 33. Once the nut has been removed, the tool may be withdrawn from the assembly and the nut 44 removed from the gripping member 30.

In reference to FIGURES 4 and 5, the gripping member is shown in usage with a conventional Phillips head screws 38 wherein during assembly, the nub 42 carried by the free ends of the projections 41 are disposed over the head of the screw 38 to grasp the underside thereof so as to maintain the wedge 37 in proper alignment with the slot on the head of the screw.

With respect to FIGURE 6, the wedge 37 is shown as having a blunt tip 45 formed by converging side walls 46 located on opposite sides of the wedge and by tapered and converging end surfaces 47.

With respect to FIGURE 7, the body member 40 included in the gripping member 30 is shown which may be composed of suitable plastic material wherein the projecting members are resilient or contain sufficient resiliency to flex in a radial direction about the central axis of the body about pivot areas A.

Therefore, it is seen that the device of the present invention provides for the fastening together of several tubular elements each of which are provided with a preformed shape so that a chuck carrying a part gripping means or contact means can be rotated by a handle via a flexible element such as a cable. Such means are provided for rotating the chuck and the part contacting device from a distance so that screws, nuts or other rotatable parts which would be otherwise inaccessible can be readily manipulated and operated upon.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A locating and starting tool for hardware items comprising:
   a preformed and shaped rigid tubular member;
   an extension tubular segment having a preformed and shaped angular configuration detachably secured to a selected end of said tubular member;
   a flexible means disposed within said member and said segment along the full combined length thereof;
   a hardware item holding means secured to one end of said flexible means; and
   a knob releasably secured to the other end of said flexible means whereby rotary movement of said knob effects rotary movement of said holding means via said flexible means when said knob is secured and said knob having a through bore and being slidable on said cable when released whereby the effective length of said flexible means may be increased to accommodate the combined length of said tubular member and said tubular segment when said knob is released.

2. A locating and starting tool for a rotatable hardware item comprising:
   a preformed and shaped rigid tubular member;
   a flexible cable rotatably disposed within said member along the full length thereof and extending beyond one end thereof;
   a chuck having a socket for detachably receiving a hardware item holding member and being secured to one end of said flexible cable;
   a knob having a bore rotatably and slidably mounted on the end of said tubular member opposite to its end carrying said chuck;
   additional preformed and shaped tubular sections adapted to be carried on said tubular member enclosing said flexible cable and arranged in end-to-end relationship with said tubular member;
   means for securing said additional tubular sections to said tubular member and to each other so as to provide an elongated multi-angled and co-existensive angular composite tubular member enclosing said flexible cable; and
   means releasably securing said knob to said flexible cable extending beyond said one end of said tubular member whereby rotary movement of said knob effects rotary movement of said chuck via said flexible cable when said means is secured and whereby said flexible cable is adapted to be drawn through said bore to provide additional length to accommodate the extension thereof through said composite tubular member.

3. A hardware item locating and starting tool comprising:
   a rigid tubular member;
   a tubular segment having a predetermined angular shape and being adapted to be inserted into areas which would otherwise be inaccessible;
   means for detachably coupling said tubular segment to said tubular member whereby the overall length of the tool is increased;
   flexible means rotatably disposed within said member along the full length thereof and adapted to be selectively rotatably disposed within said segment;
   a chuck secured to one end of said flexible means and having a rear side thereof abutting against one end of said tubular member or said segment;
   a knob having a through bore coaxial with said tubular member for slidably receiving a portion of said flexible means and being rotatably carried on the end of said tubular member opposite to its end abutting against said chuck whereby rotation of said knob effects rotation of said chuck via said flexible means; and
   means carried on said knob for detachably connecting said flexible means to said knob whereby said flexible means may be selectively drawn through said tubular member for disposition through said tubular segment so that said flexible means extends through the combined length of both said tubular member and said segment.

4. The invention as defined in claim 3 wherein said chuck includes a shaped socket formed therein adapted to reecive one end of a hardware item locating or turning tool member which includes a shank having a wedge shaped terminus on its end opposite to its end received into said chuck socket and a body portion carried about said shank having a plurality of cantilevered resilient projections extending axially substantially in parallel about the longitudinal axis of said shank and wherein each of said projections includes a thickened portion adapted in combination with thickened portions of other of said projections and said wedge shaped terminus to retain a hardware item thereon.

5. A hardware item locating and starting tool comprising:
   a rigid tubular member having a predetermined angular shape and being adapted to be manipulated into areas which would otherwise be inaccessible;
   flexible means rotatably disposed within said member along the full length thereof;
   a chuck having a socket for detachably receiving one end of a hardware parts gripping and engaging member and being secured to one end of said flexible means wherein a rear side of said chuck abuts against one end of said tubular member;
   said hardware parts gripping and engaging member comprising a shank having a wedge shaped terminus on its end opposite to its end received into said chuck socket and a body portion carried about said shank having a plurality of resilient projections cantilevered from said body portion and being radially disposed about said wedge shaped terminus and cooperating therewith to releasably grip and retain the hardware part;
   a knurled knob having a through bore coaxial with said tubular member for receiving a portion of said flexible means and being rotatably carried on the end of said tubular member opposite to its end abutting against said chuck whereby rotation of said knob effects rotation of said chuck via said flexible means; and means for releasably securing said knob to said flexible means.

6. The invention as defined in claim 5 including:

additional preformed and shaped tubular sections carried on said tubular member and being coaxial therewith and arranged in an end-to-end relationship; and means for securing said additional tubular sections to said tubular member so as to provide an elongated multi-angled and co-extensive angular composite tubular member enclosing said flexible means.

7. A hardware item locating and starting tool comprising:

a rigid tubular member having a predetermined angular shape and being adapted to be inserted into areas which would otherwise be inaccessible;

flexible means rotatably disposed within said member along the full length thereof;

a chuck secured to one end of said flexible means and having a rear side thereof abutting against one end of said tubular member;

said chuck including a shaped socket formed therein adapted to receive one end of a hardware item locating or turning tool member which includes a shank having a wedge shaped terminus on its end opposite to its end received into said chuck socket and a body portion carried about said shank having a plurality of cantilevered resilient projections extending axially substantially in parallel about the longitudinal axis of said shank and wherein each of said projections includes a thickened portion adapted in combination with thickened portions of other of said projections and said wedge shaped terminus to retain a hardware item thereon.

8. A hardware item locating and starting tool comprising:

a chuck having a shaped socket for receiving and retaining a hardware item locating or turning tool for releasably retaining a specific hardware item, said tool turning member including a shank having a wedge shaped terminus on its end opposite to its end received into said chuck socket and a body portion carried about said shank having a plurality of cantilevered resilient projections extending substantially in parallel about the longitudinal axis of said shank and being adapted to releasably grip the hardware item;

a knob;

a flexible cable extending between said chuck and said knob;

rigid and preformed angular tubular stock rotatably supporting said knob on one end thereof and encasing said flexible cable and being adapted to be manipulated within an area which would otherwise be inaccessible;

said flexible cable being of a predetermined length extending beyond said knob; and means for releasably securing said knob to said flexible cable.

References Cited

UNITED STATES PATENTS

| | | | |
|---|---|---|---|
| 2,576,742 | 11/1951 | Wolny | 145—52 |
| 2,892,477 | 6/1959 | Holt | 145—50 |

FOREIGN PATENTS

| | | |
|---|---|---|
| 1,124,534 | 7/1956 | France. |
| 28,448 | 1913 | Great Britain. |
| 408,895 | 4/1934 | Great Britain. |
| 257,179 | 3/1949 | Switzerland. |
| 279,025 | 2/1952 | Switzerland. |

WILLIAM FELDMAN, *Primary Examiner.*

R. V. PARKER, JR., *Assistant Examiner.*